United States Patent [19]

Guglielmo

[11] 4,166,227

[45] Aug. 28, 1979

[54] BRUSH HOLDER FOR ELECTRIC MACHINES

[75] Inventor: Jean Guglielmo, Caluire, France

[73] Assignee: Lucien Ferraz & Cie, Lyons, France

[21] Appl. No.: 838,348

[22] Filed: Sep. 30, 1977

[51] Int. Cl.$^2$ .............................................. H02K 13/00

[52] U.S. Cl. ...................................... 310/242; 310/245

[58] Field of Search ............... 310/247, 246, 245, 239, 310/242, 240, 241

[56] References Cited

U.S. PATENT DOCUMENTS

| | | | |
|---|---|---|---|
| 2,802,960 | 8/1957 | Baker | 310/246 |
| 2,836,745 | 5/1958 | Gillie | 310/246 |
| 2,840,734 | 6/1958 | Nottelmann | 310/246 |
| 2,974,241 | 3/1961 | Harter | 310/246 |
| 3,133,218 | 5/1964 | Harris | 310/242 |
| 3,526,797 | 9/1970 | Jueschke | 310/245 |

*Primary Examiner*—R. Skudy
*Attorney, Agent, or Firm*—Dowell & Dowell

[57] ABSTRACT

The brush holder comprises a cage and a detachable clip. The cage serves to accommodate a brush and has a channel. The clip has a central leg positioned in the channel. A self-winding band spring for biassing a brush is fixed at its outer end to the central leg, which also includes engaging means, e.g. in the form of a tongue, for retaining the central leg in the channel. The clip has also two side legs bearing elastically on to the outer sides of the cage to prevent rocking of the clip relative to the cage. The central leg has preferably raised side edges and the cage is preferably cut out from a hollow cross shaped section.

8 Claims, 7 Drawing Figures

Fig. 1
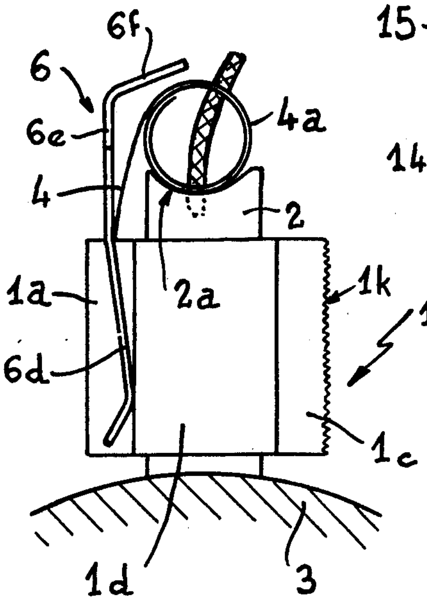
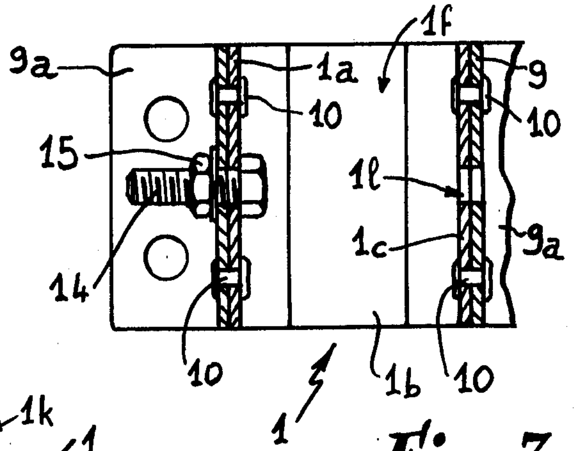
Fig. 7
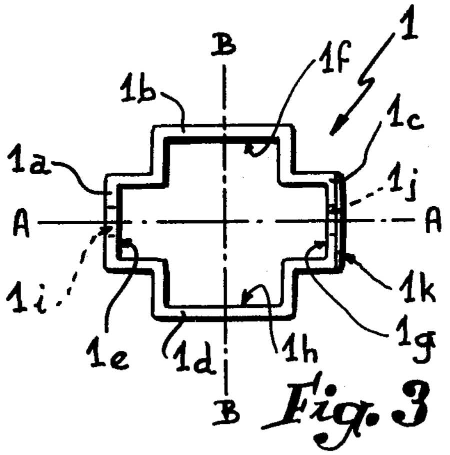
Fig. 3
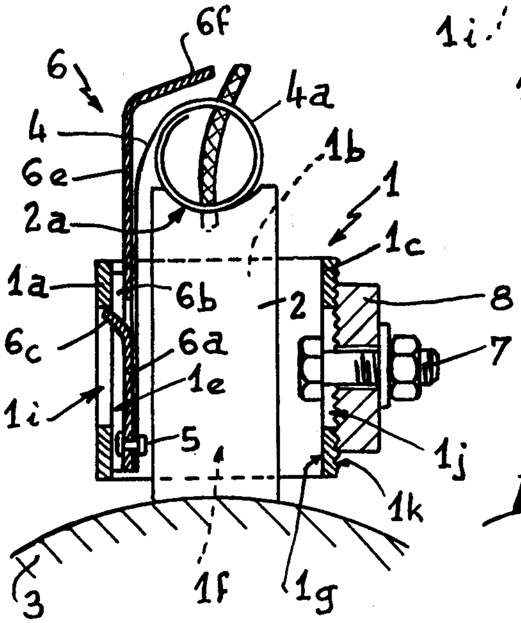
Fig. 2

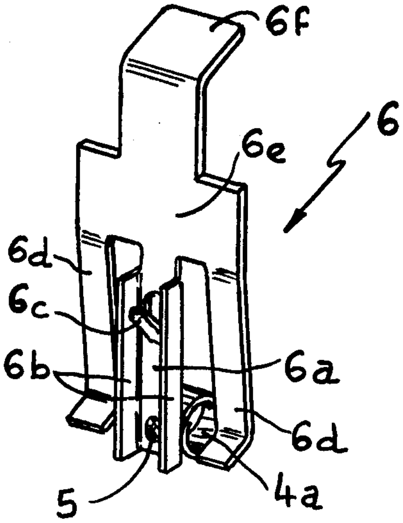
Fig. 4
Fig. 5
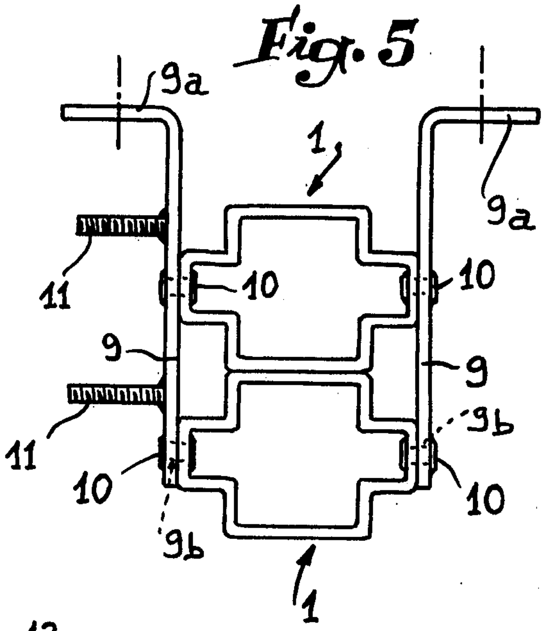
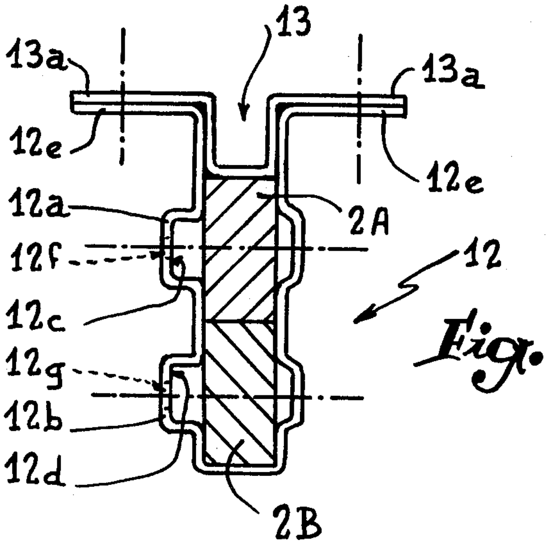
Fig. 6

BRUSH HOLDER FOR ELECTRIC MACHINES

BRIEF SUMMARY OF THE INVENTION

The present invention relates to brush holders in which the pressure spring is composed of an elastic band tending to wind about itself (self-winding spring), the wound portion bearing against the brush, while the outer end is fixed to an easily removable part of the cage of the brush holder in question.

In certain known constructions the removable part carrying the self-winding spring is folded over in the form of an elastic clip in such a manner as to clip into the cage of the brush holder but to be able to be released therefrom and folded over laterally. An arrangement of this kind is entirely satisfactory to the user, but it considerably complicates the shape of the cage and therefore entails a high cost of manufacture. Furthermore, the clip in question is held by a transversal pin and therefore can be replaced only by removing this pin. An arrangement has also been proposed in which the brush holder part is in the form of a bipod engaging in the cage. An arrangement of this kind hides the brush and hinders the inspection and replacement of the latter. In addition, it is cumbersome. Finally a brush holder part is sometimes used which comprises a single branch engaging in the corresponding cage through the reaction of the spring itself. This arrangement is simple; it entails no complication of the shape of the cage or of the dimensions of the brush holder; the part in question is easily removable and interchangeable. These indisputable advantages are nevertheless offset by the unacceptable disadvantage that the part is held in position solely by the reaction of the spring, so that if the latter should break or lose its elasticity the part will simply fall into the electric machine, which obviously gives rise to serious dangers.

The invention seeks to permit the construction of a brush holder in which the movable part carrying the self-winding pressure spring is held engaged in the corresponding cage of the brush holder independently of the reaction of the pressure spring, so that in the event of the complete failure of the spring the part in question will remain in position and there will be no danger of its falling accidentally into the machine.

The invention further seeks to make this part with a single branch so that it can be produced at a particularly low cost price from a band or strip of metal by simply cutting out, punching, and drawing.

In connection with a spring holder part of the kind in question the invention further seeks to form the elementary cage and/or the entire brush holder itself from an extruded section which is symmetrical on two axes, so as to provide the user with a large selection of possible arrangements of the case or brush holder in relation to their support.

As an alternative, the invention also seeks to make it possible to form a brush holder by the simple shaping of a metal band, in contrast to known arrangements of the kind in question which are generally produced by casting with or without injection pressure.

According to the present invention, in a brush holder cage having a self-winding band spring the brush holder part comprises on the one hand a central leg against which the outer end of the spring is fixed and against which the spring unwinds, this leg being intended to engage in a corresponding depression provided in one of the walls of the brush holder cage in question, and on the other hand two side legs disposed one on each side of the aforesaid central leg and intended to bear elastically against the outer face of the said wall on each side of the depression of the latter, for the purpose of holding the central leg applied against the bottom of the aforesaid depression, while the part and the cage are provided with means adapted to cooperate with one another in order to secure the said part in position in the cage after it has been completely pushed into the latter.

The central leg is preferably made substantially more rigid than the side legs, so as to lie very flat against the bottom of the corresponding depression. For this purpose it may be provided with side edges raised at right angles.

The means adapted to secure the brush holder part after it has been completely driven into the cage may consist of a raised tongue incompletely cut out of the central leg of the part and a corresponding opening provided in the bottom of the aforesaid depression.

According to another characteristic of the invention a brush holder cage adapted to receive a brush holder part of the kind described above is simply cut out from a hollow cross-shaped section of which at least one arm forms the depression receiving the central leg of the part, the side legs of the latter projecting on each side of the said arm and bearing elastically against the side walls of the two adjacent arms. This section preferably has two axes of symmetry so that the brush holder part can be engaged in either of two oppositely situated depressions. The bottoms of these depressions are then cut out to form an aperture serving at will either to receive the securing tongue of the spring holder part or to permit the passage of a bolt or rivet for fastening the cage to a support. The section selected may obviously be entirely symmetrical so as to form four identical depressions adapted to receive the spring holder part.

In a modified embodiment the cage in question is made by folding a metal band, which can moreover thus form a plurality of successive cages of cross-shaped profile having one or two axes of symmetry as the case may be, the ends of this band being fixed by welding or otherwise to a base plate adapted to be fixed in turn by screws, bolts, or the like inside the machine concerned.

BRIEF DESCRIPTION OF THE DRAWING

The invention will now be described, by way of example, with reference to the accompanying diagrammatic drawings in which:

FIG. 1 is a side view of a brush holder cage to which the present invention is applied, FIG. 2 is a longitudinal section thereof, FIG. 3 is a plan view of the cage shown separately, FIG. 4 shows in perspective the spring holder part or clip, FIG. 5 illustrates how cages according to FIGS. 1 to 3 can be mounted between two longitudinal members in order to form a multiple rigid brush holder, FIG. 6 is a plan view of a modified construction of a brush holder according to the invention, and FIG. 7 is a cross-section of a modification of the arrangement shown in FIG. 5.

DESCRIPTION OF PREFERRED EMBODIMENTS

The embodiment shown in FIGS. 1 to 4 comprises a cage 1 having a hollow cross-shaped transverse profile (see FIG. 3) which is symmetrical with respect to two planes A—A and B—B which are perpendicular to one another. The arms 1*a*, 1*b*, 1*c* and 1*d* of this profile form four internal rectangular depressions, namely a pair of identical depressions, 1*e*, 1*g* and a pair of identical depressions 1*f*, 1*h*. Elongated windows 1*i*, 1*j* are cut out of the bottoms of two opposite depressions 1*e* and 1*g*. In addition, the outer face of the bottom of the depression 1*g* is provided with transverse grooves 1*k*.

The two opposite depressions 1*b* and 1*d* delimit the ends of a rectangular space in which a brush 2 is slidable, the brush being intended to bear against a rotating element 3, such as for example a commutator. Pressure is applied to this brush by a self-winding band type spring 4 the loop 4*a* of which acts on the head of the brush, which is suitably shaped for the purpose. In the example illustrated the head of the brush has a depression 2*a* formed in it for the purpose of centering the loop 4*a*, but the head could also be in the form of an inclined plane in known manner.

The free end of the spring 4 is fixed by a rivet 5 (FIG. 2) to the end of the central leg 6*a* of a spring holder part or clip 6. This leg 6*a* is provided with side edges 6*b* raised at right angles to it, giving it greater rigidity than the side legs 6*d*. It is engaged in the depression 1*e*, the aforesaid edges 6*b* bearing against the bottom of the depression, thus forming the space necessary to receive the head of the fastening rivet 5. A tongue 6*c* is also raised by incompletely cutting or punching it from this leg 6*a*, this tongue 6*c* being directed obliquely and forming a tooth engaging against the opposite end of the window 1*i* to that where the rotating element 3 is disposed.

The leg 6*a* (FIG. 4) is surrounded with suitable clearance by two side legs 6*d* which bear elastically against the outer side faces of the arms 1*b* and 1*d* adjacent the arm 1*a* which delimits the depression 1*e* receiving the rigid central leg 6*a*. It will be understood that in these circumstances the part 6 thus forms a kind of three-branched clip which clips against the bottom of the depression 1*e* independently of the reaction of the spring 4 acting on it and the two side legs bear against the outer face of the cage on each side of the depression groove 1*e* and are positioned to prevent the clip 6 from rocking about the point of contact of the tongue 6*c* and the window 1*i*.

The part 6 is extended above the legs 6*a*, 6*d* by a portion 6*e* which forms a common base for the said legs, and then by a narrower lug 6*f* which is curved above the loop 4*a* (the latter being assumed to be in its highest position).

The part 6 is thus held in place reliably even if the spring 4 should break or for any reason cease to apply the intended reaction to it. Consequently, it cannot in any circumstances be accidentally released from the cage. It is placed in position almost instantaneously; it is sufficient to engage the central leg 6*a* in the depression 1*e*. taking care to leave the other two legs outside the cage. Similarly, when it is desired to remove it, it is sufficient to push the lug 6*f* towards the right in FIGS. 1 and 2 so as to release the tongue 6*c*. The second window 1*j* can be used for the passage of a bolt 7 or the like making it possible to fix the cage against a support having a knurled surface, such as that indicated at 8.

The depressions 1*e* and 1*g* are interchangeable as regards the fastening of the part or clip 6, which means that if it is desired to dispense with any grooved or knurled bearing surface it is possible to place this clip on the right in FIGS. 1 and 2, the cage being fastened on the left.

It is important to note that the cage 1 has a very simple cross-sectional profile which is continuous from one end to the other. It can therefore be produced by cutting off from a hollow section of great length, or even continuously extruded, the grooving and the cutting-out of the windows being effected during the cutting. It is thus possible to achieve extremely low cost prices which are considerably lower than those of the cages at present produced by moulding.

The device according to FIGS. 1 and 2 permits the construction of brush holders having one or more cages. It is in particular possible to use an arrangement similar to that described in French patent application Ser. No. 76 02066 of Jan. 20, 1976 in the name of the present Applicants for "Improvements to multiple brush holders", according to which complete cages, that is to say cages containing their brush and the system applying pressure to the latter, are mounted in the style of braces between two longitudinal members so as to form, together with the latter, a light but very rigid compound beam.

An arrangement of this kind intended for two cages is shown by way of example in FIG. 5, but extrapolation would obviously be possible in the case of three or more cages. At 9 can be seen the two flat longitudinal members with their ends 9*a* folded over at right angles to constitute a fastening lug. The two cages 1 are connected to the members 9 by means of rivets 10 whose heads are of slight height so as not to obstruct the positioning of the central leg of the spring holder part or clip (not shown). Pins 11 permit the fastening of the usual braids associated with the brushes. The transverse walls of the two cages 1 which are in contact may optionally be welded to one another in order to improve rigidity.

In order to permit the engagement of the retaining tongue 6*c* of each clip it is sufficient to provide a hole such as 9*b* in one of the longitudinal members 9 and in the adjacent wall of each cage.

FIG. 6 shows a modified embodiment in which one or more cages intended to receive spring holder parts according to the invention are formed by folding from the same metal strip 12 so as to constitute two successive projections 12*a*, 12*b* with corresponding internal depressions 12*c*, 12*d* adapted to receive a part or clip of the kind given the reference 6 in FIGS. 1 to 3. The strip is then folded over twice at 90° so as to form a generally U-shaped profile, the free ends of the branches of this U being folded over at 90° to form fastening lugs 12*e*. Another piece of strip 13, folded over to form a narrower and much shorter U, closes the outlet of the other U-shaped profile, the ends of its branches being folded over at 13*a* to coincide with the lugs 12*e*. The bottoms of the depressions 12*c*, 12*d* are perforated at 12*f*, 12*g* in order to enable the spring carrier clip to be clipped in position.

In the arrangement shown in FIG. 6 the two brushes, which have been shown in section at 2*a* and 2*b* are in contact with one another, because there is no separating partition.

The brush holder shown in FIG. 6 could obviously contain only a single brush, or on the contrary be arranged to receive more than two brushes, if desired.

It will be noted that in the arrangement shown in FIG. 6 the double cage is not symmetrical in relation to its longitudinal axis, so that the clips can be mounted only on one of its sides. However, it will readily be understood that symmetry could be respected if so desired.

FIG. 7 shows in section a modified detail of the arrangement shown in FIG. 5. Here again are seen the two longitudinal members 9 with their fastening lugs 9*a*, a cage 1, and its rivets 10 for fastening it to the longitudinal members 9. Here, however, holes 1*l* and 9*e*, facing one another, are provided in the longitudinal members and in the cages in order to receive bolts 14 which are fastened in position by nuts 15, their ends projecting on the outside serving the purpose of the pins 11, which are here not provided. The user can thus place the connecting braids on the side which seems to him more convenient, and in addition, the operation of welding the pins 11, which is always a little difficult, is avoided.

It must in addition be understood that the description above has been given only by way of example and that it does not in any way limit the scope of the invention which will not be departed from by replacing the constructional details described by any other equivalents.

What I claim is:

1. A brush holder for an electric machine having a rotating element to be engaged by the brush, the holder comprising a cage and a detachable clip, the cage having a longitudinal opening disposed substantially radially of said rotating element to slidably accomodate a brush and the cage having a longitudinal groove extending along one of the inner walls of the cage, and said clip comprising a base portion supporting a central leg shaped to slide in the groove inside the cage, a self-winding band spring fixed at its outer end to the central leg with the wound portion of the spring being located to overlie the associated brush and bias it toward said rotating element when the central leg is engaged in the said groove, the clip including releasable means for engaging the cage and retaining the clip when it reaches the bottom of the groove by opposing the reaction of the spring, and the clip further including two side legs extending from the base portion adjacent to the central leg and arranged to bear elastically against the outer face of the cage on each side of the groove, the two side legs being positioned to prevent the clip from rocking about the point of contact of said means engaging the cage for retaining the central leg in the bottom of the groove.

2. A brush holder according to claim 1, wherein the central leg is substantially more rigid than the two side legs.

3. A brush holder according to claim 2, wherein the central leg has side edges raised at right angles to it.

4. A brush holder according to claim 3, wherein the raised edges are directed towards the bottom of the groove.

5. A brush holder according to claim 1, wherein the releasable engaging means for securing the central leg comprises a tongue raised by incompletely cutting it out from the said leg, and tongue being engageable in an aperture provided in the bottom of the groove.

6. A brush holder according to claim 1, comprising at least one cage having a hollow cross-shaped opening with four arms, at least one of which forms said groove in the form of a depression adapted to receive the central leg of the clip, the side legs of the latter projecting on each side of the said arm so as to bear elastically against the side walls of the two adjacent side arms.

7. A brush holder according to claim 6, wherein the cross-shaped opening is symmetrical with respect to two longitudinal planes of symmetry perpendicular to one another, in such a manner that the clip is selectively engageable in either of two grooves facing one another, the bottoms of both the grooves being apertured so as to receive respectively the releasable engaging means of the clip.

8. A brush holder according to claim 1, wherein the cage comprises a first portion having a U-shaped strip with thin metal walls whose profile in a plane transverse to the longitudinal opening for the brush at least partly surrounds the brush and has at least one groove operative to receive said clip, and said U-shaped strip comprising two parallel branches between which the brush opening is located, the ends of the said branches extending outwardly from each other and comprising fastening lugs, and a second portion of the cage comprising a smaller U-shaped transverse strip located between said lugs and closing the open end of the first portion to retain the brush, the second portion also having ends comprising fastening lugs superimposed on and fixed to the lugs of the first portion.

* * * * *